(12) United States Patent
Boyes et al.

(10) Patent No.: US 11,609,485 B2
(45) Date of Patent: Mar. 21, 2023

(54) MODULAR CAMERA MOUNTS USABLE WITH SECURITY CAMERA APPLICATIONS

(71) Applicant: Johnson Controls Tyco IP Holdings LLP, Milwaukee, WI (US)

(72) Inventors: Derek Joseph Boyes, Aghalee (GB); Frederick Michael McBride, Belfast County Down (GB)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/196,596

(22) Filed: Mar. 9, 2021

(65) Prior Publication Data

US 2021/0278754 A1 Sep. 9, 2021

Related U.S. Application Data

(60) Provisional application No. 62/987,189, filed on Mar. 9, 2020.

(51) Int. Cl.
*G03B 17/56* (2021.01)
*F16M 13/02* (2006.01)
(Continued)

(52) U.S. Cl.
CPC .......... *G03B 17/561* (2013.01); *F16M 11/10* (2013.01); *F16M 11/2014* (2013.01); *F16M 13/02* (2013.01)

(58) Field of Classification Search
CPC ................ G03B 17/561; G03B 13/196; F16M 13/02–027
See application file for complete search history.

(56) References Cited

U.S. PATENT DOCUMENTS 5,790,910 A * 8/1998 Haskin ................... F16M 11/14
248/181.1
8,186,893 B1 * 5/2012 Patterson ............... F16M 11/10
396/428
(Continued)

OTHER PUBLICATIONS

"Update An Intercom to a New Video Doorbell with these covers" at http://kyleswitchplates.blogspot.com/2018/07/update-intercom-to-new-video-doorbell.html). (Year: 2018).*

*Primary Examiner* — Leon W Rhodes, Jr.
(74) *Attorney, Agent, or Firm* — ArentFox Schiff

(57) ABSTRACT

Aspects of the present disclosure relate to camera mounts interoperable with cameras mountable in a wide variety of different environments. The camera mount may include a bracket, wherein the bracket may be configured to be secured to a mounting surface. The bracket may be comprised of an adapter plate interoperable with a wall switch plate, wherein the wall switch plate secures to the mounting surface. The adapter plate may include a first plurality of mounting holes configured to align with a second plurality of mounting holes positioned within the wall switch plate. The mount may further include an angled portion that includes a second cable route opening and a plurality of mounting provisions that may be configured to align with the mounting holes and a first cable route opening of the adapter plate. The angled portion may further include a camera mounting surface configured to interoperate with the adjusting portion.

20 Claims, 15 Drawing Sheets

(51) Int. Cl.
*F16M 11/20* (2006.01)
*F16M 11/10* (2006.01)

(56) References Cited

U.S. PATENT DOCUMENTS

| | | | | |
|---|---|---|---|---|
| 10,447,938 B2 * | 10/2019 | Ekbladh | .............. | H04N 5/23296 |
| 10,827,574 B1 * | 11/2020 | Fu | ........................... | F21S 8/033 |
| 2016/0300476 A1 * | 10/2016 | Kasmir | .................... | G08B 3/10 |
| 2019/0043325 A1 * | 2/2019 | Jeon | .................. | G08B 13/1963 |
| 2019/0219223 A1 * | 7/2019 | Zhou | .................... | F16M 13/022 |
| 2019/0239368 A1 * | 8/2019 | Ghaemi | ............... | H05K 5/0217 |
| 2019/0348829 A1 * | 11/2019 | Davis | ....................... | H02B 1/48 |
| 2020/0236262 A1 * | 7/2020 | Moncino | ................ | F16M 13/02 |

* cited by examiner

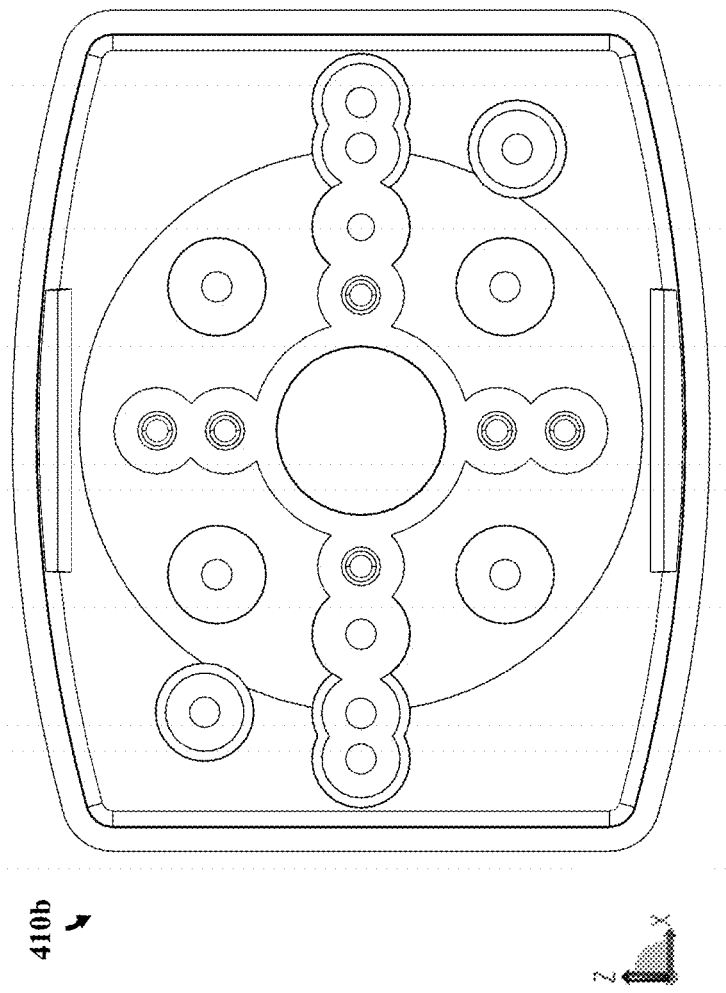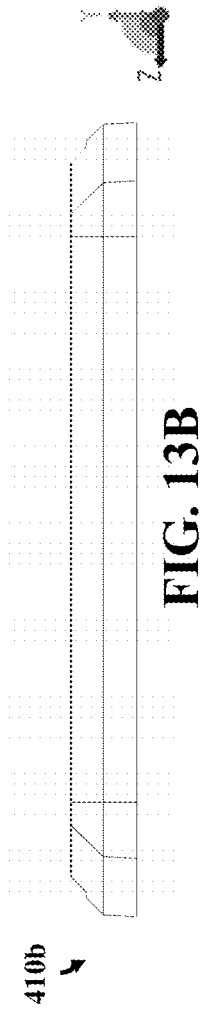
FIG. 13A
FIG. 13B

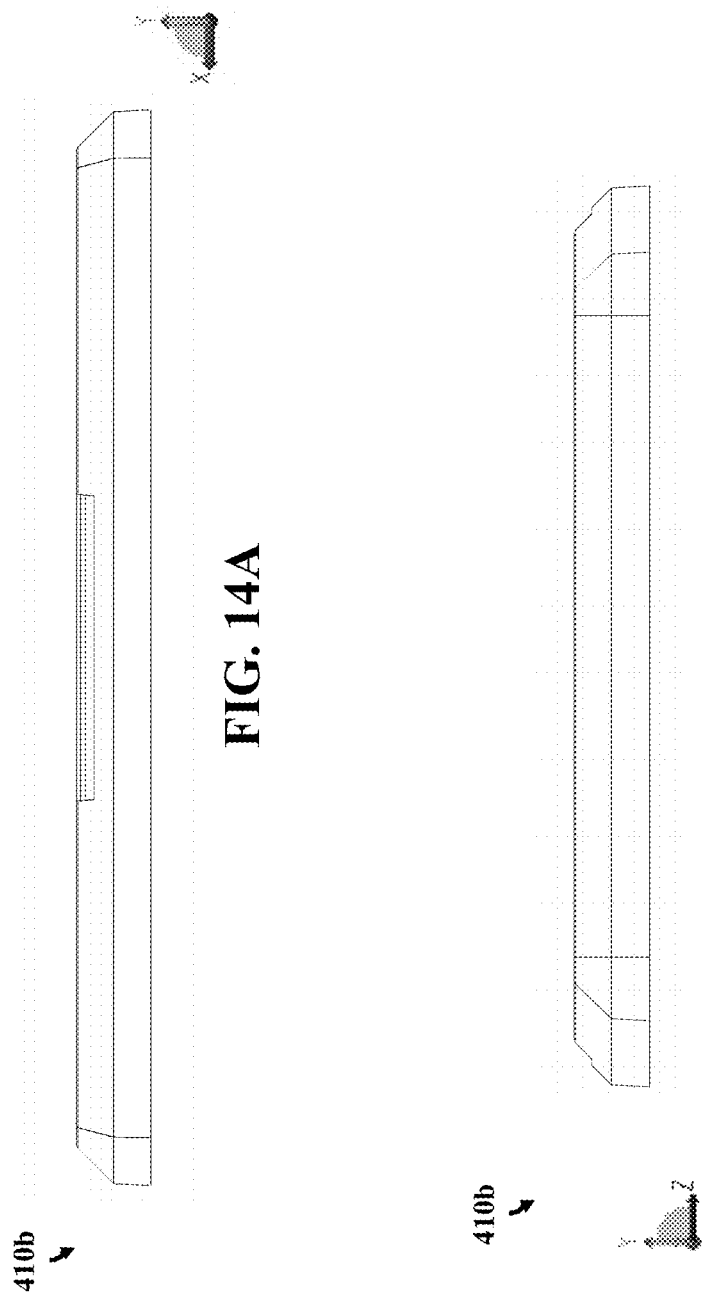

MODULAR CAMERA MOUNTS USABLE WITH SECURITY CAMERA APPLICATIONS

CROSS REFERENCE TO RELATED APPLICATIONS

This application claims priority to U.S. Provisional Application No. 62/987,189 filed on Mar. 9, 2020, and titled "MODULAR CAMERA MOUNTS USABLE WITH SECURITY CAMERA APPLICATIONS," the contents of which is hereby incorporated by reference in the entirety.

TECHNICAL FIELD

Aspects of the present disclosure relate to camera mounts configured to securably mount cameras for security, surveillance, or access control or other implementations in a variety of different environments, such as environments that have limited mounting areas or mount-limiting architecture.

BACKGROUND

With modern advances in technology, cameras have been adapted to be implemented as security mechanisms capable of monitoring various physical locations or acting as access security or identity verification systems so as to replace the need for constant surveillance by human guards and/or to function either in conjunction with or as an alternative to keys, keypads, and/or radio frequency identification based systems. When configured to monitor or surveil, these cameras may be placed such that they are discrete and not otherwise noticeable to individuals within the space they record.

Thus, there exists an unmet need in the related art for a camera configured for security, surveillance, and/or access control that can be mounted a wide variety of different environments that include a wide variety of different materials and architectural styles.

SUMMARY

Consequent of the deficiencies described above, as well as others, there remains an unmet need for a camera configured for surveillance, security, access control, or other similar needs, wherein the camera includes a mount interoperable with the camera, such that the camera may be adequately in a variety of different environments.

In view of the above problems and short comings, as well as others, aspects of the present disclosure relate, among other things, to camera mounts interoperable with security cameras implementable in a wide variety of different environments. The camera mount, according to various aspects, may include a bracket, wherein the bracket may be configured to be secured to a mounting surface. In one example, the bracket may be comprised of an adapter plate interoperable with a wall switch plate, wherein the wall switch plate secures to the mounting surface. However, in another example, the adapter plate may be configured to be directly securable to the mounting surface without need for the wall switch plate as an intermediate component. The adapter plate may include a first plurality of mounting holes, wherein the plurality of mounting holes may be configured to align with a second plurality of mounting holes positioned within the wall switch plate. Further, the adapter plate may include a first cable route opening. The first cable route opening and the first plurality of mounting holes of the adapter plate may be configured to interface with a corresponding plurality of mounting provisions and a corresponding second cable route opening, respectively, of an angled portion of the camera mount. The angled portion may be configured as a wedge, wherein the wedge may be angled at 45° relative to the mounting surface. The angled portion may further include a camera mounting surface located thereon, such that the camera mounting surface may interoperate with an adjusting portion. The adjusting portion, which may interoperate with or otherwise secure to the camera, may be configured to be pivotable 20° around an axis parallel to the mounting surface. In combination, the adjusting portion and the angled portion may facilitate the positioning of the camera such that the camera includes a viewing angle that may vary up to 65° relative to the mounting surface.

Additional advantages and novel features of these aspects will be set forth in part in the description that follows, and in part will become more apparent to those skilled in the art upon examination of the following or upon learning by practice of the disclosure.

BRIEF DESCRIPTION OF THE FIGURES

FIGS. 13A and 13B are bottom and front views of the combined adapter of FIGS. 11-12B according to aspects of the disclosure.

FIGS. 14A and 14B are right side and rear views of the combined adapter of FIGS. 11-13B according to aspects of the disclosure.

DETAILED DESCRIPTION

Figure 1:
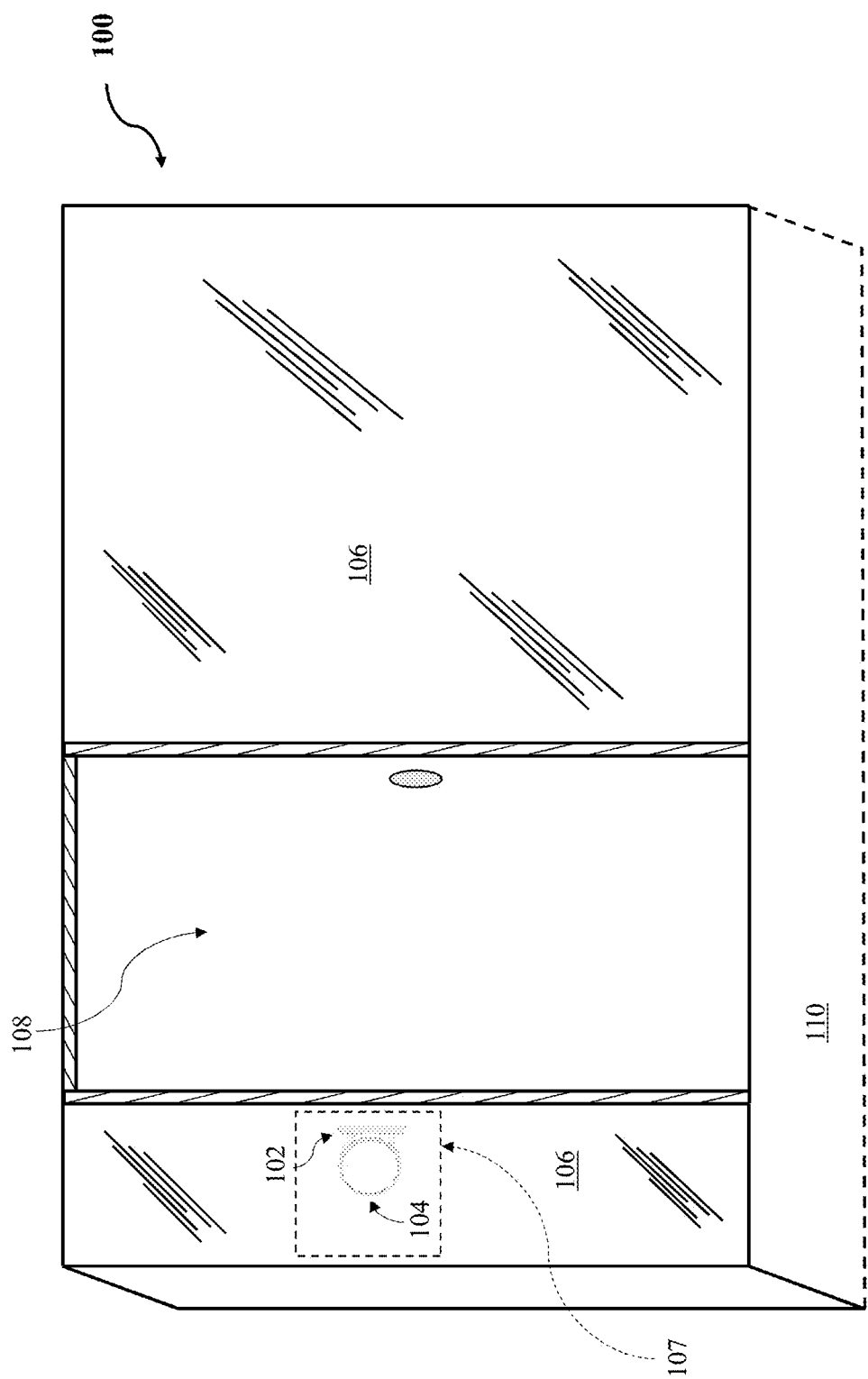
FIG. 1 is a front view of an environment, including a door, a door frame, an adjacent wall, and a hallway comprising an architecture having limited mounting capabilities, in which an example camera mount and camera are implemented, according to various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Throughout the disclosure, the terms substantially or approximately may be used as a modifier for a geometric relationship between elements or for the shape of an element or component. While the terms substantially or approximately is not limited to a specific variation and may cover any variation that is understood by one of ordinary skill in the art to be an acceptable variation, some examples are provided as follows. In one example, the term substantially may include a variation of less than 10% of the dimension of the object or component. In another example, the term substantially or approximately may include a variation of less than 5% of the object or component. If substantially is used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the system and apparatus described herein is installed an in an in-use orientation. Further, in order to provide context to the current disclosure, a broad overview of the discovered deficiencies of various systems and an example implementation of the current disclosure and the advantages provided by the disclosure are described below. Further details of example implementations of the current disclosure are described in detail with reference to the figures below.

In some implementations, when cameras are configured to function as an access control or identity verification system, these cameras may be placed in comparatively more obvious locations as compared to typical surveillance cameras, such as at eye level or otherwise adjacent to a door (as compared to on a ceiling or high on a wall), for example, in order to facilitate facial recognition technology or other similar identification methods by the camera. When these cameras are used for performing access control within environments designed to include walls, doors, and other physical barriers without a sufficient space or area to where a camera may be secured, security cameras as described within the related art are often not mountable, and thus may not adequately perform such monitoring and/or facial recognition tasks. Further, in environments that are designed to accommodate tight spaces such as narrow corridors, angled corners, or long hallways, for example, there are also often limited adequate locations in which a camera may be secured within the environment such that the camera is positioned at an angle necessary to surveil the environment and/or perform access control functions. For example, due to being at a relatively high height, typical mounting locations of cameras high on a wall or on a ceiling pose challenges, or do not function at all, in applications for recognizing individually recognizable features, such as a face, of mobility-aided individuals. In this scenario, a camera must be mountable at a sufficiently lower height, such that access control and/or identity verification methods may be implemented on mobility-aided individuals and non-mobility-aided individuals alike.

In addition, a user or installer may wish to limit the number of holes and/or other permanent specialized fixtures necessary to mount such a camera system. Thus, it may be useful to mount a camera used for access control purposes to a standard or commonly used fixture that is either already installed within a wall and/or that may be installed in the wall. In one example, the fixture may be hidden from view, for example, within a wall plate. One example of the aforementioned standard fixture is an electrical outlet box or "gang box," which may be used for switches, electrical outlets, and/or which may be used for installing an access control camera system.

The present disclosure provides one or more advantages in such scenarios or installations, including providing one or more implementations of a camera mount system that allows flexibility by providing interchangeable components for adjusting the angle of the camera with relation to a mounting surface and/or for providing an adaptable interface for various standard electrical outlet boxes or other mounting fixtures.

Referring to FIG. 1, according to various aspects of the present disclosure, a camera mount 102 and a camera 104 may be installed in an example in-use orientation, such as relative to a door positioned within a mounting-restricted environment 100. Generally, mounting-restricted environment 100 may be include a physical location, such as indoor locations including but not limited to hall ways, corridors, atriums, waiting rooms, etc., or outdoor locations, such as entrances and porches, for example, wherein camera mounting locations are limited due to the architecture, layout, inanimate objects occupying the environment, or otherwise. In mounting-restricted environments 100, the structural surfaces may be constructed at angles, and the environment may include long corridors, tight corners or other similar obstacles. For example, mounting-restricted environment 100 of FIG. 1 may include a hallway 110 leading to a door 108 disposed within a wall 106. Wall 106 and door 108 may be configured to limit access to a designated space located behind wall 106 and door 108, wherein hallway 110 may be configured to be more generally accessible. Further, door 108 and wall 106 may be oriented within hallway 110 such that there may be insufficient locations to secure traditional security cameras, surveillance cameras, access control cameras, or other similar monitoring cameras, such that the camera may be positioned adequately relative to the people or objects that the camera is configured to monitor and/or identify. Specifically, FIG. 1 includes an example implementation of such a camera mount and associated camera, such as camera mount 102 and camera 104, that provide a solution for the deficiencies in the related art as described above, such that camera mount 102 and camera 104 may be mounted within mounting-restricted environment 100 at a first mounting surface 107. While mounting surface 107 is referred to throughout the specification as a surface, it is noted that surface 107 may have an opening with an electrical box installed therein. In another example, the electrical box may be a box installed behind surface 107 with an accessible cavity or box with an outermost surface recessed with first surface 107 and may have a conduit (not shown) that is connected to and in communication with the electrical box. The conduit may be provided for running cables therethrough for providing connections to electrical sources, network sources and the like within the electrical box. The electrical box may also include mounting provisions 219, which may be threaded mounting holes for receiving bolts and/or self-tapping screws or any other fastener or series of fasteners that are known in the art.

First mounting surface 107 may include a mountable material, such as but not limited to a metal, a plastic, a composite, and/or sheet-rock. In FIG. 1, first surface 107 may be a wall; however, first surface 110 is not limited to including only walls. Camera mount 102 and camera 104 may be configured to be sized to allow for secure mounting of the camera 104 within the mounting-restricted environment 100. Further, camera 104 and camera mount 102 may be configured such that together, the camera 104 and the camera mount 102 may be sufficiently compact, such that camera 104 and camera mount 102 do not interfere with and/or are not obtrusive to people that may occupy environment 100. For example, the camera 104 may be mounted to avoid accidental contact with the people in the environment 100. Various aspects of the present disclosure will be described in greater detail in the sections that follow, including the modular components of the camera mount 102, which may facilitate increased flexibility and may allow the camera mount 102 to be implemented in a variety of environments.

Figure 2:
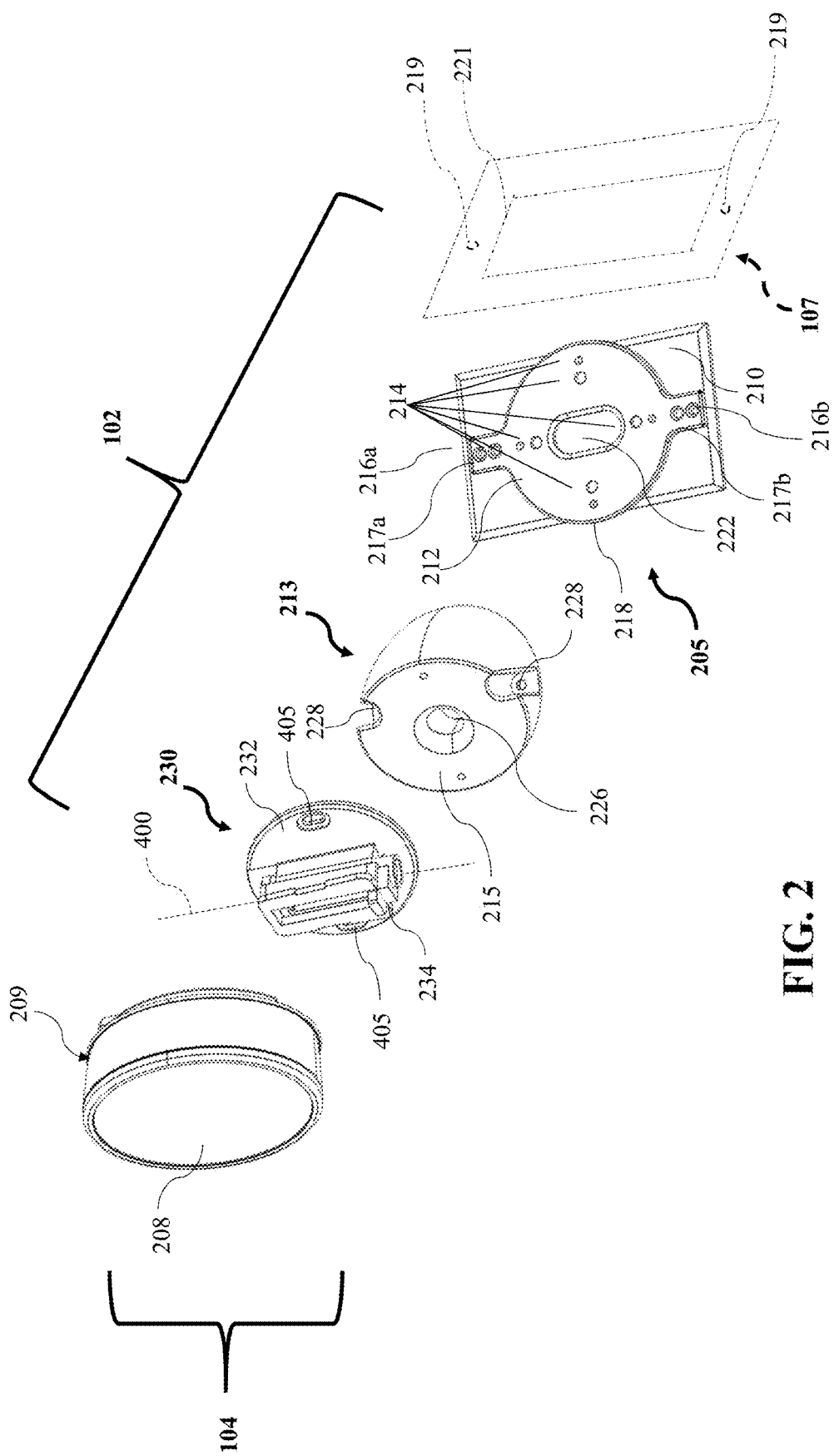
FIG. 2 is a front exploded perspective view of an example camera mount and camera, according to aspects of the present disclosure.
Figure 3:
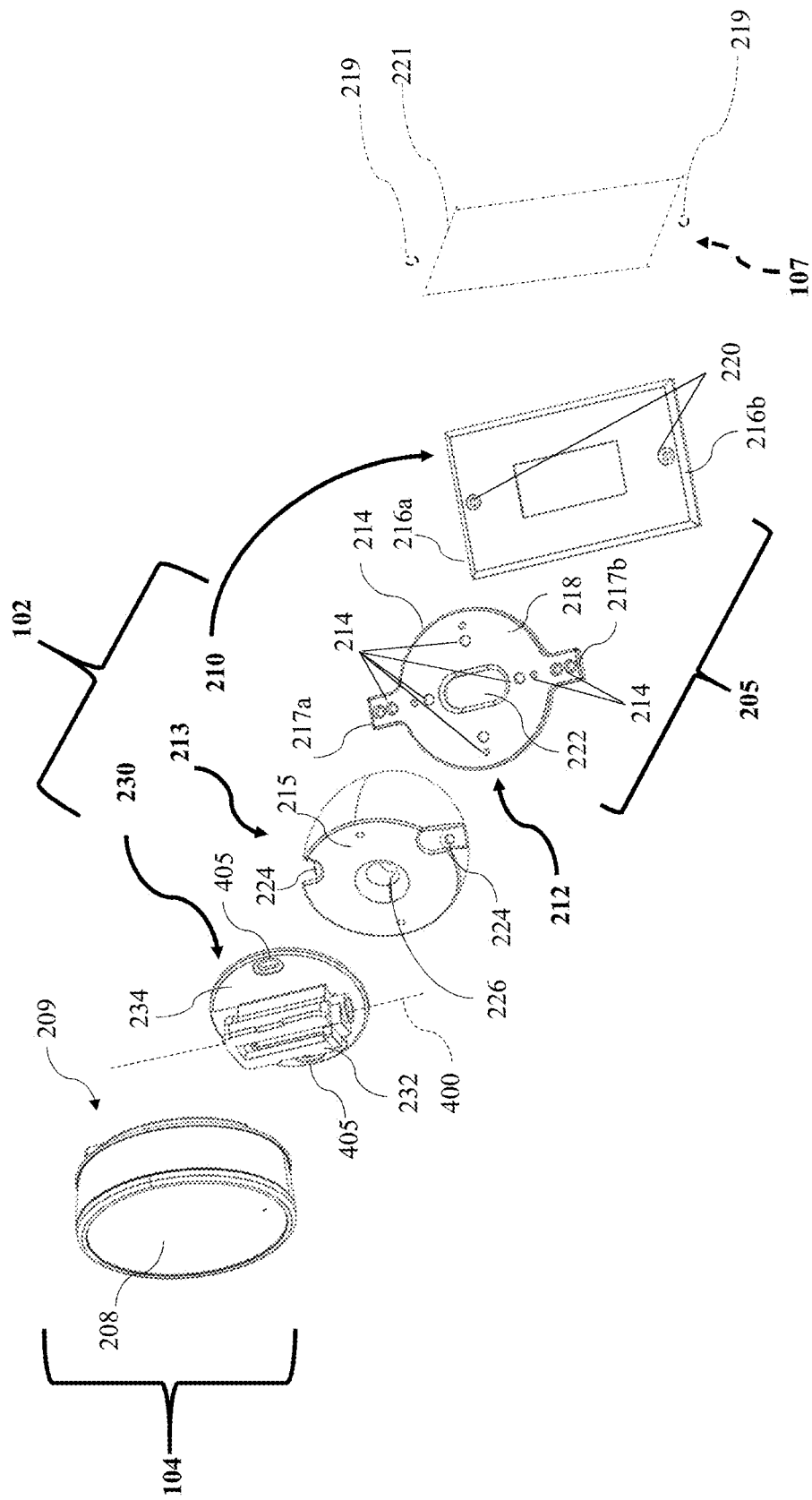
FIG. 3 is a front exploded perspective view of an example camera mount and camera, according to aspects of the present disclosure.

Referring to both FIGS. 2 and 3, according to various aspects of the present disclosure, the camera mount 102 includes one or more components configured to secure the camera 104 to a first surface (e.g., first surface 107 in FIG. 1). In one implementation, for example, the first surface 107 may be a relatively small surface positioned within a corner (see FIG. 1). However, first surface 107 is not limited to what is illustrated in FIG. 1. In another example, first surface 107 may include any section within wall 106. Camera 104 may comprise a body 209 and one or more camera lenses 208. The one or more camera lenses 208 may include fixed or movable lenses, concave and/or convex lenses, and/or a flat lens (or cover lens). For example, one or more camera lenses 208 may function as a cover that provides protection to a single or a plurality of camera lenses beneath the one or more cover lenses. In one example, camera 104 may include a single or plurality of wide angle cameras and/or lenses configured to monitor at least a 110° angle of view, or in other implementations up to a 63° angle of view. Camera body 209 may further house a variety of other technological and electronic equipment necessary for the operation of the camera that is well known to one of ordinary skill in the art, such as a lens aperture, mirrors, or a focusing screen, for example. Camera 104 may be configured to perform a variety of security, surveillance, or access control functions. In one example camera 104 may be configured to surveil or monitor at least a portion of the environment in which it is located. Further, camera 104 may be configured to operate as an access reader either as an alternative to or in conjunction with the aforementioned surveillance functions. In this example, camera 104 may be configured with facial recognition technology, and may be secured to a first surface (e.g., first surface 207 in FIG. 2) such that camera 104 may be positioned to accurately recognize facial features of individuals of a plurality of heights, including those individuals in wheel chairs or other mobility aiding devices.

Camera mount 102 may include a bracket 205 that may be configured to mount to first surface 107 (see FIG. 3). In one example, referring to FIG. 2, a version of the first surface 107 may include first surface 107A having an electrical box installed therein. In another example, the electrical box may be a box installed behind surface 107A with an accessible cavity or box with an outermost surface recessed with first surface 107A and may have a conduit (not shown) that is connected to and in communication with the electrical box. The conduit may be provided for running cables therethrough for providing connections to electrical sources, network sources and the like within the electrical box. The electrical box may also include mounting provisions 219, which may be threaded mounting holes for receiving bolts and/or self-tapping screws or any other fastener or series of fasteners that are known in the art.

Bracket 205 may further include a wall switch plate 210, which may be configured to mount to and/or least partially cover the opening provided by the electrical box, The wall switch plate 210 may be selectively interoperable with an adapter plate 212, as illustrated specifically in FIG. 2. However, bracket 205 need not include both wall switch plate 210 and adapter plate 212. For example, bracket 205 may include only the adapter plate 212. Yet, in another example, referring to FIGS. 4A and 4B, bracket 205 may include only a combined wall switch plate and adapter combination 410, which is configured to have an angled portion 213 mounted directly thereto. In this case, the wall switch plate and adapter combination is directly mountable to the surface 107 and/or an electrical box at surface 102. In another example, referring to FIGS. 2-3, the wall switch plate 210 and adapter plate 212 are two separate components. Camera mount 102 and its component parts, such as bracket 205, wall switch plate 210, adapter 212, and/or the aforementioned wall switch plate and adapter combination 410, may be formed from a variety of materials, such as but not limited to a glass-filled polycarbonate material, metal, metal alloy, or other similar material that is sufficiently structurally rigid to support the camera 104 and the camera mount 102. For the purposes of this disclosure, the term "sufficiently structurally rigid" may be defined by the ability of a material to successfully endure an abuse test of at least 10 IK. Further, wall switch plate 210 may be configured to be interoperable with mounting provisions of an electrical switch and outlet box, one example of which is described above with respect to FIG. 2.

Referring to FIGS. 2, 3, and 4, adapter plate 212 may be configured to include a circular section 218, wherein circular section 218 further includes a first rectangular protrusion 217a and a second rectangular protrusion 217b for fixing the adapter plate 212 to the wall switch plate 210. First protrusion 217a may be positioned such that first protrusion 217a is located across from protrusion 217b. Further, first rectangular protrusion 217a may approximately align with a first edge 216a of wall switch plate 210, when wall switch plate 210 and adapter plate 212 are aligned. Similarly, second rectangular protrusion 217b may approximately align with a second edge 216b of wall switch plate 216b, when wall switch plate 210 are aligned. However, though adapter plate 212 is illustrated to include circular section 218, and protrusions 217a-217b illustrated as rectangular, the shape of adapter plate 212, including circular section 218 and protrusions 217a-217b, is not limited to the shape as illustrated in either FIG. 2 or FIG. 3. For example, circular section 218 may be configured to be shaped in a variety of different geometric shapes, and may otherwise be rectangular, ovular, triangular, etc. Further, first and second protrusions 217a and 217b, though illustrated to be rectangular, may similarly be configured to be shaped in a variety of different geometric shapes.

Additionally, adapter plate 212 may further include a plurality of mounting holes 214 for use in for fixing the adapter plate 212 to the wall switch plate 210. In one example, at least one of the plurality of mounting holes 214 may be positioned in rectangular protrusion 217a, and at least one other of the plurality of mounting holes 214 may be positioned in rectangular protrusion 217b. Mounting holes 214 may facilitate the mounting of camera 104 to first surface 107, and thus may be primarily circular in cross section. However, mounting provisions 214 are not limited to a cross-sectionally circular shape. Wall switch plate 210 may also include a plurality of mounting holes 220, as illustrated in FIG. 3, wherein mounting holes 220 may be positioned or otherwise configured such that mounting holes 220 align with mounting holes 214 when wall switch plate 210 and adapter plate 212 are placed with respect to one another. In another aspect, the mounting holes 214 may be positioned so as to align with a variety of standard wall-mounting plates and/or electrical boxes. For example, a first set of mounting holes may be configured to align with a standard U.S. size wall plate, which may for example have nominal dimension of 2.75 inches by 4.5 inches with two holes that are 3.25 inches center to center. Likewise, a second set of holes may be configured to align with a standard United Kingdom or European wall plate having nominal dimensions of 3.425 inches by 3.425 inches with two holes that are 2.374 inches center to center. It is noted that the aforementioned spacing's are only intended as examples, the adapter plate 212 may have holes and/or hole spacing's to accommodate any hole spacing, which may for example correspond with universal switch plates and/or cover plates that are standard in various regions of the world. As shown and described in FIGS. 4A and 4B below, an adapter plate may be combined with a switch or wall box plate to form a combined adapter 410a and/or 410b allowing for an adjustable bracket 230 and/or angled portion 213 to be mounted directly to the combined adapter 410a and/or 410b.

Adapter plate 212 may further include a first cable route opening 222. First cable route opening 222 may be configured such that a cable may electrically connect camera 104 to an external power source and/or a network via a cable, wire, or other electrically conductive pathway.

According to various aspects, angled portion 213 may be configured to be interoperable with bracket 205 to aid in adjusting a field of view of the camera 104. In one example, angled portion 213 may be configured to interoperate with adapter plate 212, wherein adapter plate 212 may then interoperate with or be mounted to wall switch plate 210, such that wall switch plate 210 may secure camera 104 to first surface 107. However, in another example, angled portion 213 may be configured to secure to adapter plate 212 via a plurality of mounting provisions 224, wherein adapter plate 212 directly secures to first surface 107, without need for wall switch plate 210. Further, mounting provisions 224 may additionally be configured to align with mounting holes 214 and/or mounting holes 220, so as to facilitate securing camera 104 to first surface 107. Mounting provisions 224 may be threaded and configured to receive corresponding fasteners, wherein fasteners (not shown) may be threaded fasteners, and/or may be dimensioned to receive a self-tapping fasteners, to name a few examples. The fasteners may include any combination of screws, rivets, bolts or other similar devices configured to secure a plurality of modular components relative to each other via mounting provisions 224, mounting holes 214, and mounting holes 220.

Figure 4A:
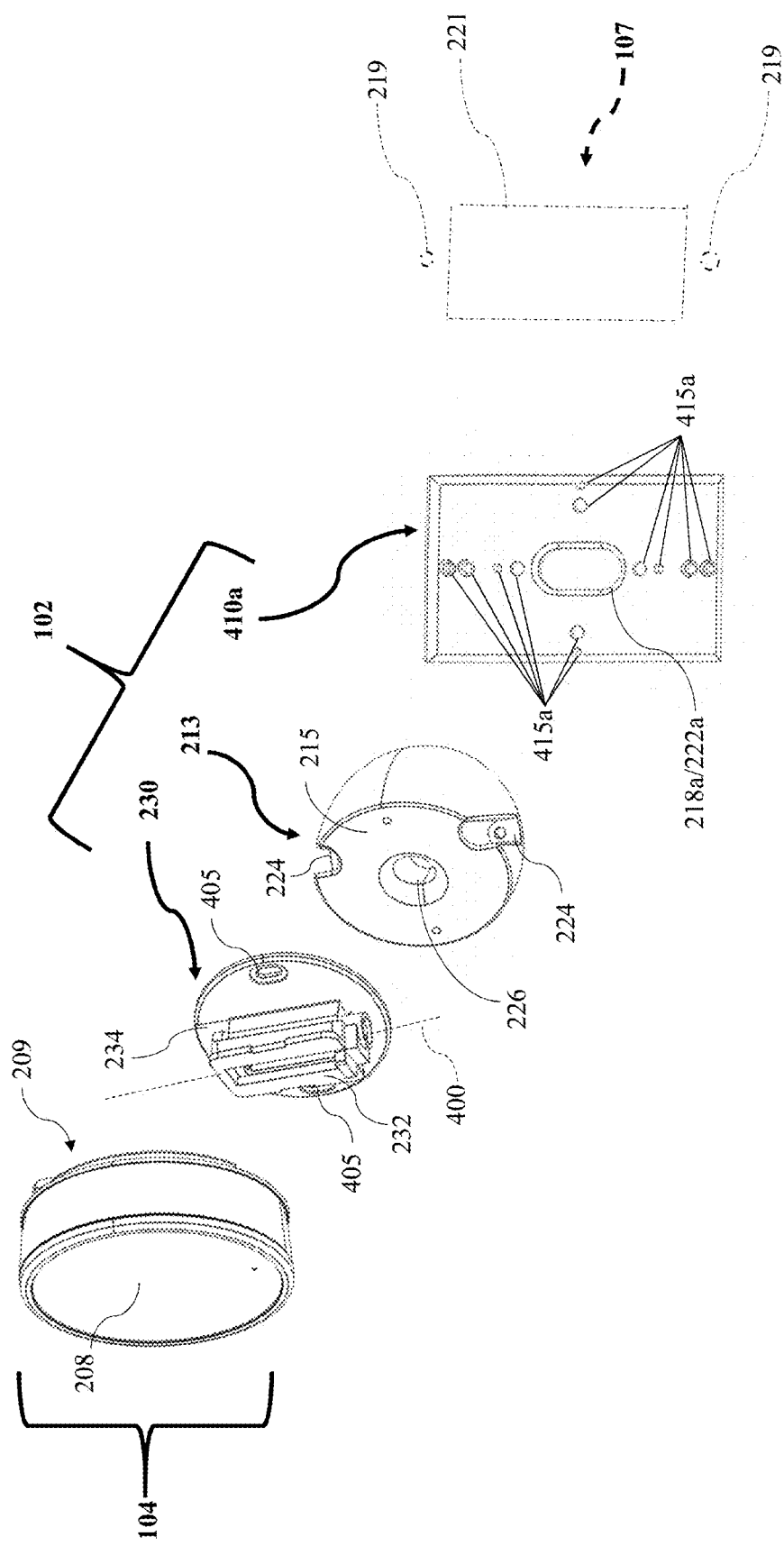
FIG. 4A is a front exploded perspective view of an example camera mount and camera, according to aspects of the present disclosure.
Figure 4B:
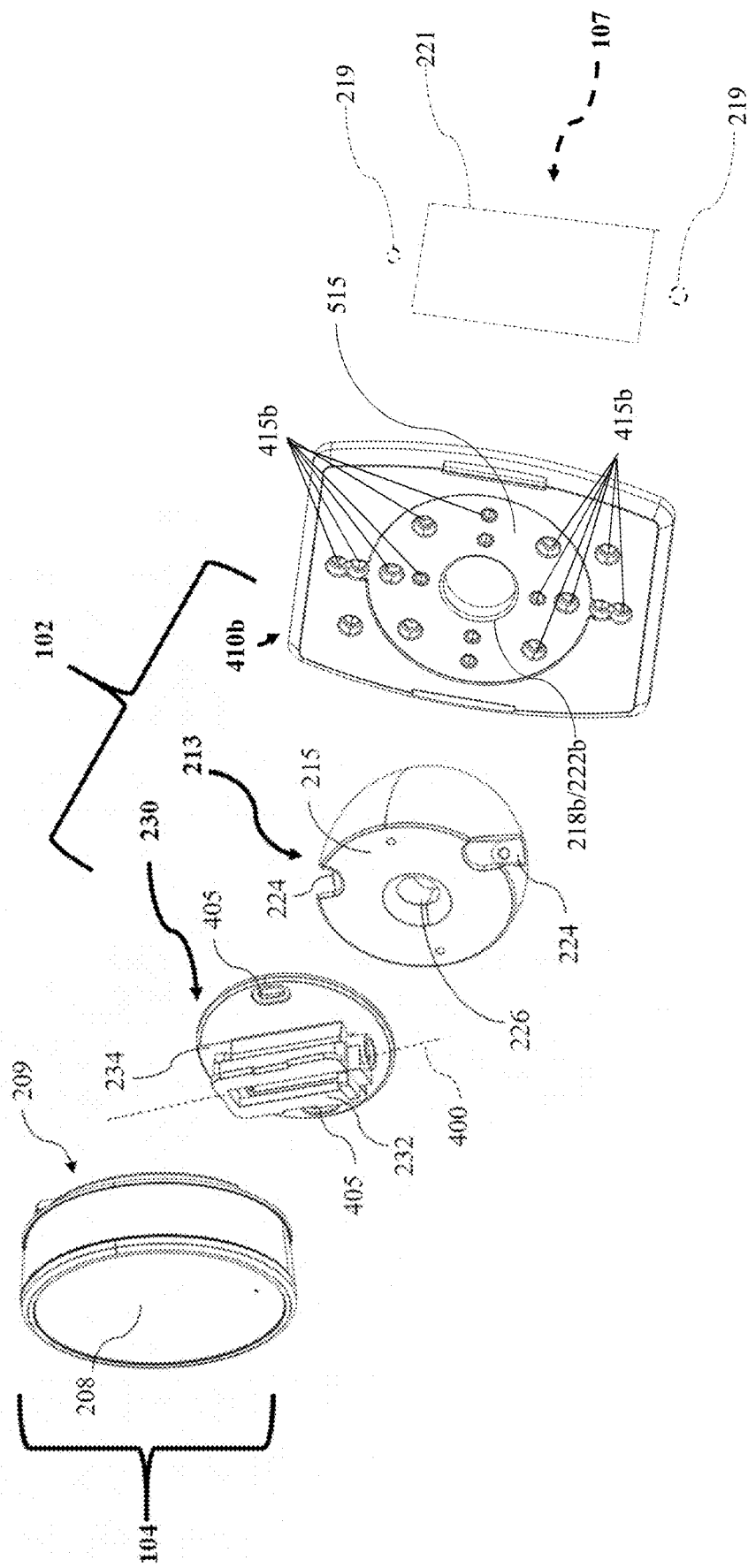
FIG. 4B is a front exploded perspective view of an example camera mount and a camera according to aspects of the present disclosure.

Referring to FIGS. 4A and 4B, mounting holes 220 and mounting holes 214 may be combined into one set of mounting holes 415a and/or 415b, wherein mounting holes 415a and/or 415b are positioned within wall switch plate and adapter combination 410a and/or 410b. Thus, mounting provisions 224, mounting holes 214, and mounting holes 220 may each be comprised of recesses of a variety of shapes depending on the type, size, and shape of implemented fasteners (not shown).

Angled portion 213 may also include a camera mounting surface 215 that may be located thereon angled portion 213, and be configured for mounting camera 104 thereto. Further, camera mounting surface 215 may be configured to be angled with respect to first surface 107. Angled portion 213 may further include a second cable route opening 226, wherein second cable route opening 226 may be configured to align with first cable route opening 222, first cable route opening 222 and second cable route opening 226 interoperate to form a conduit through which a cable may be run, such that a cable may electrically connect camera 104 to an external power source through camera mount 102.

It is noted that the angled portion 213 may for example be omitted when mounting the camera to combined adapter 410a and/or 410b, in which case the adjustment bracket 230 may be mounted directly to any one or a combination of mounting holes 414a and/or 415b. In the aspect shown in FIG. 4B, the combined adapter 410b may for example include a recessed portion 515 that corresponds with either the mounting surface of the angled portion 213 and/or the adjustment bracket 230, which reduces the profile of the assembled mount and/or facilitates the alignment of the combined adapter with either one of or a combination of the angled portion 213 and/or the adjustment bracket 230 when assembling the bracket.

Further, angled portion 213 may be configured to be removably connected to adjustment bracket 230 at camera mounting surface 215. Angular adjustment bracket 230 may include an adjusting component 232 fixed to a base component 234. Adjusting component 232 may be configured to allow for the adjustment of an angle of camera 104, and thus camera lens 208 camera mount with relation to first surface 107. In one example, adjusting component 232 may comprise a pivoting member, wherein the pivoting member may allow camera 104 to rotate or pivot at least 20° about an axis 400 as in FIG. 5, relative to first surface 107. In another example, adjusting component 232 may be a hinge configured to allow for adjustment of the viewing angle of camera 104. In addition, base component 234 may be configured to secure angular adjustment bracket 230 to angled portion 213 at camera mounting surface 215. Referring to both FIG. 2 and FIG. 3, base component 234 may be cross-sectionally circular in area. In an example implementation, the circle is defined by a diameter of approximately 95 mm. In an additional example, base component 234 may be defined by a diameter between 60 mm and 150 mm, and in a third example base component 234 may include a diameter between 80 mm and 110 mm. The size of the cross-sectional area of base component 234 may be altered based on, for example, the size of the camera 104, or the mounting surface area of angled portion 213. Base component 234 may also include base component mounting provisions 405. The base component mounting provisions 405 may for example be a series of holes configured to align with mounting provisions 224 of angled portion 213, mounting holes 214 of adapter plate 212, and/or mounting holes 220 of wall switch plate 210. Accordingly, the base component 234 may be mountable to angled portion 213, adapter plate 212, and wall switch plate 210 by passing a series of fasteners through base component mounting provisions 405 and threading the fasteners into corresponding mounting provisions 224, mounting holes 214 and 220, and therethrough into a first surface, such as first surface 107 (see FIG. 3).

Figure 5:
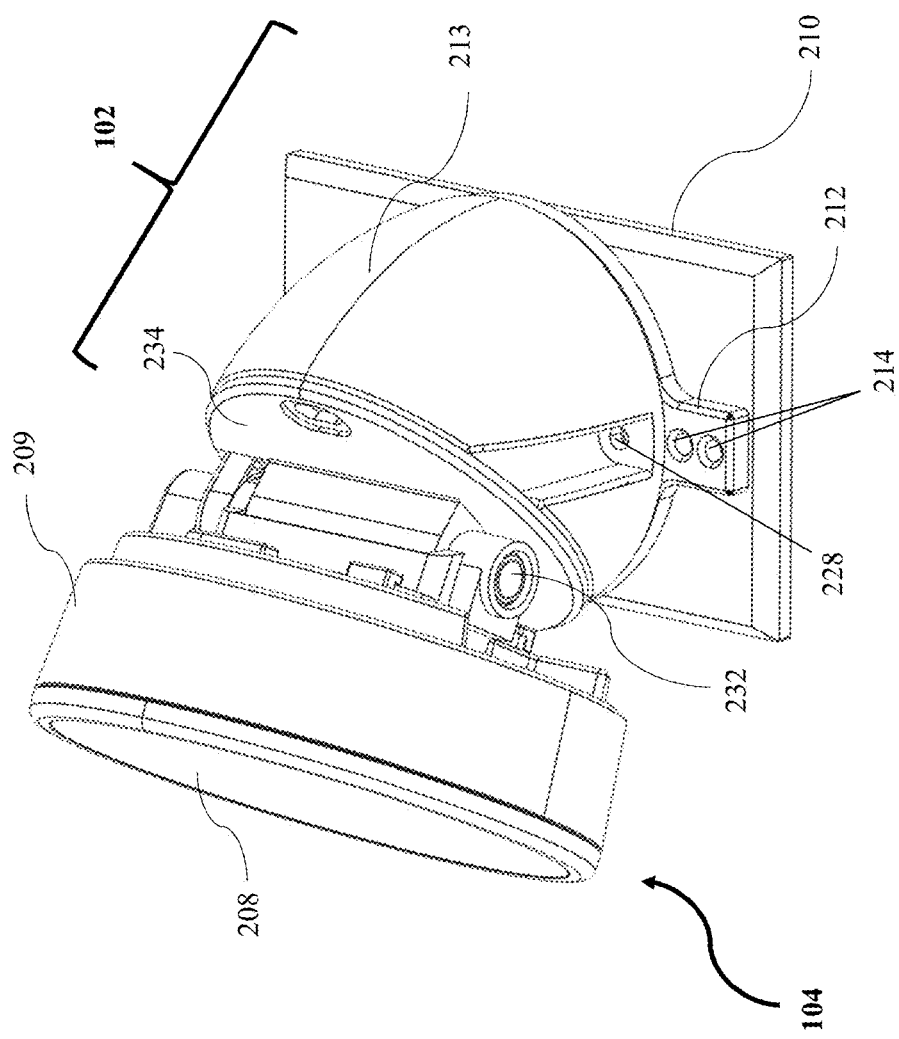
FIG. 5 is a perspective view of an angled portion, according to aspects of the present disclosure.

Referring to FIG. 5, according to various aspects of the present disclosure, the camera 104 may securably interoperate with the mount 102. In one example, adjustment bracket 230 and camera 104 may be configured to include a sliding interface, wherein a mounting portion extending from a back side of the camera 104 slidably inserts into, and is releasably secured by, the adjusting component 232 of adjustment bracket 230. (see FIGS. 2-3) However, in another example, camera 104 may clip or otherwise interlock into the adjustment bracket 230 of mount 102 (not illustrated). In yet another example, camera 104 may twistably secure into adjustment component 232, similar to a threaded screw (not illustrated). Camera 104 may be comprised of the body housing member 209, wherein body housing member 209 may be configured to house the various technological components necessary for the operation of camera 104, such as camera lens 208. Housing member 209 may be secured to the adjusting component 232, for example, that facilitates moving camera 104 to a variety of different positions and thus a variety of different viewing angles. Adjusting component 232 may interoperate with base member 234, which may be configured to secure to the angled portion 213. In one example, angled portion 213 may be configured to be a wedge shape, wherein the wedge may be configured to be any value that provides the camera 104 with a desired field of view. For example, the angled portion 213 may have a wedge shape of approximately 45°, such that camera 104 may be configured to include a field of view that may be adjusted between 0° and 65°, as adjusting component 430 may contribute an additional 20° of adjustability. However, in another example, angled portion 213 may have an angle less than 45°, wherein the value of the angle of angled portion 213 may be influenced by the architecture of the environment in which camera 104 is installed.

Angled portion 213 may be secured to the adapter plate 212 via a plurality of threaded fasteners or other similar fastening components through both the plurality of mounting holes 214 and a plurality of mounting provisions 224. In one example, adapter plate 212 may secure directly to a surface, such as first surface 107 as illustrated in FIGS. 2 and 3. However, as illustrated in FIG. 4A, adapter plate 212 may interoperate with a wall switch plate 210. In this example, wall switch plate 210 may be secured to a first surface, such as first surface 107 (e.g., as shown in FIGS. 2 and 3), or with mounting provisions of an electrical switch and outlet box.

Figure 6:
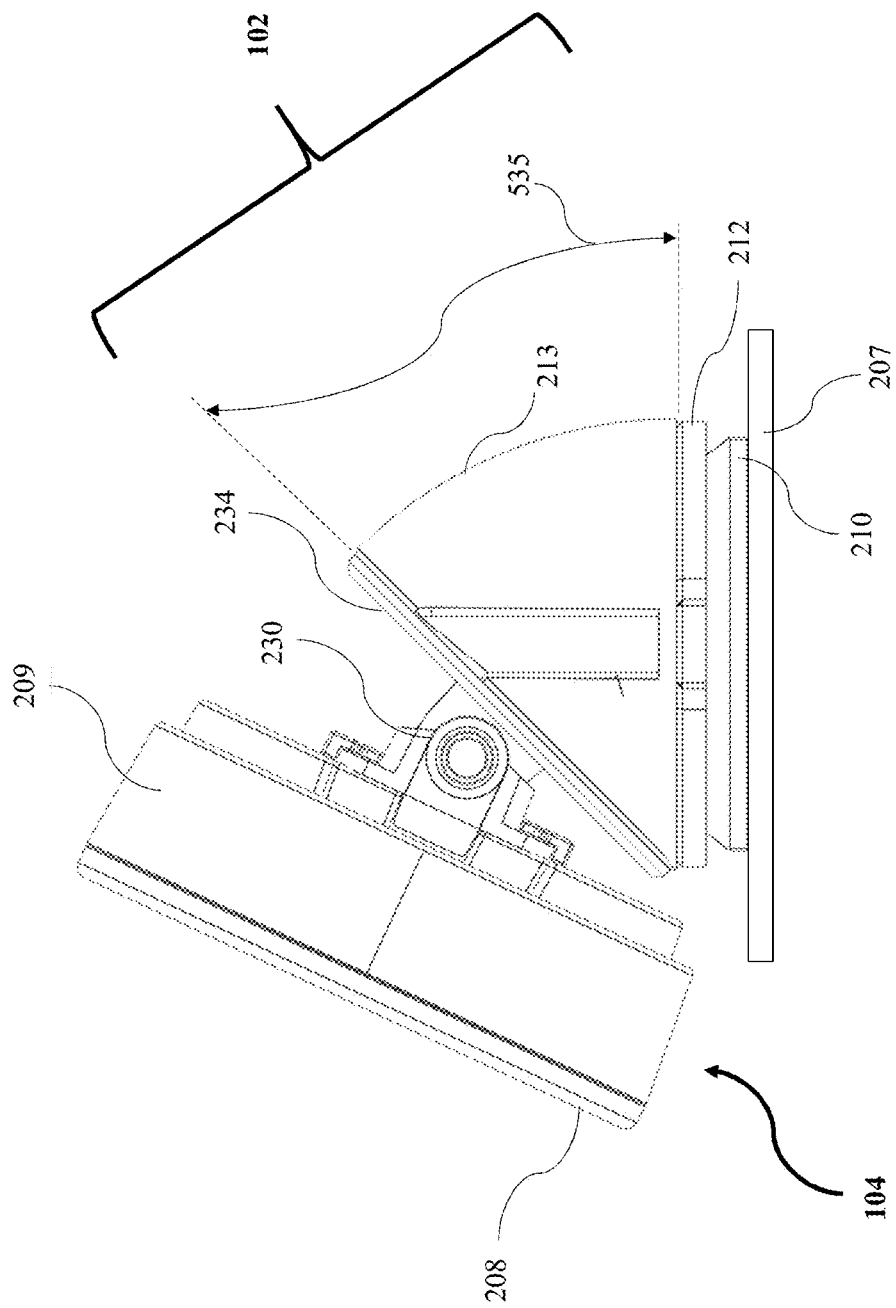
FIG. 6 is a side view of an example angled portion, according to aspects of the present disclosure.
Figure 7:
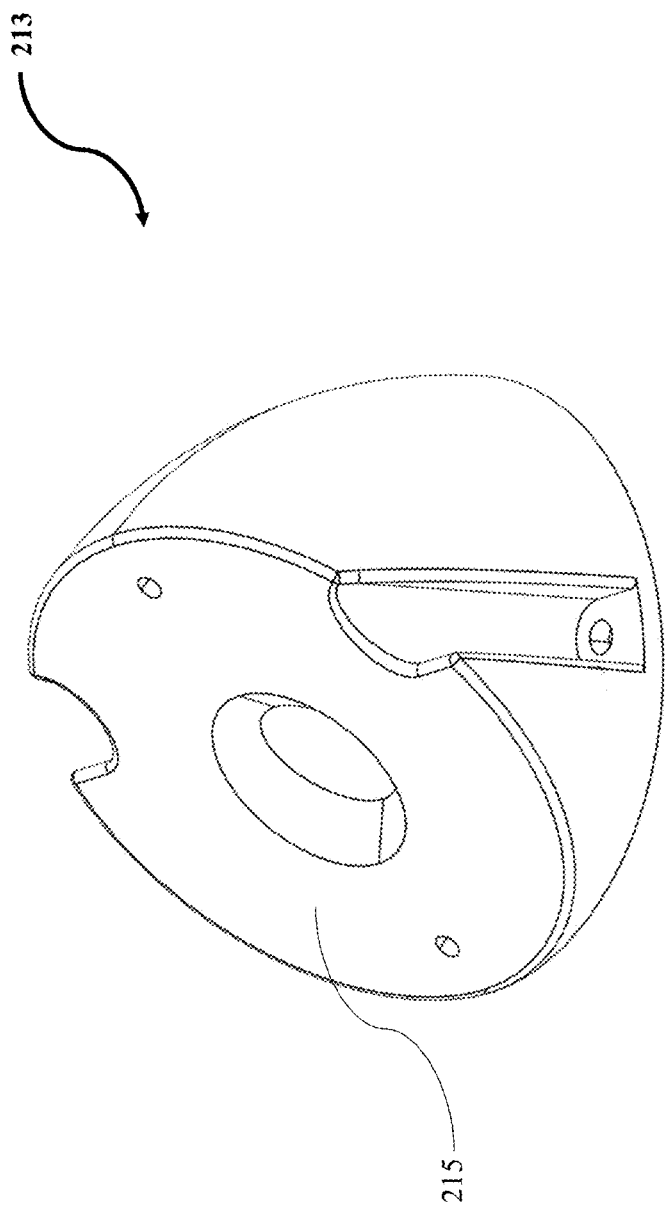
FIG. 7 is a perspective view of an example angled portion, according to aspects of the present disclosure.
Figure 8:
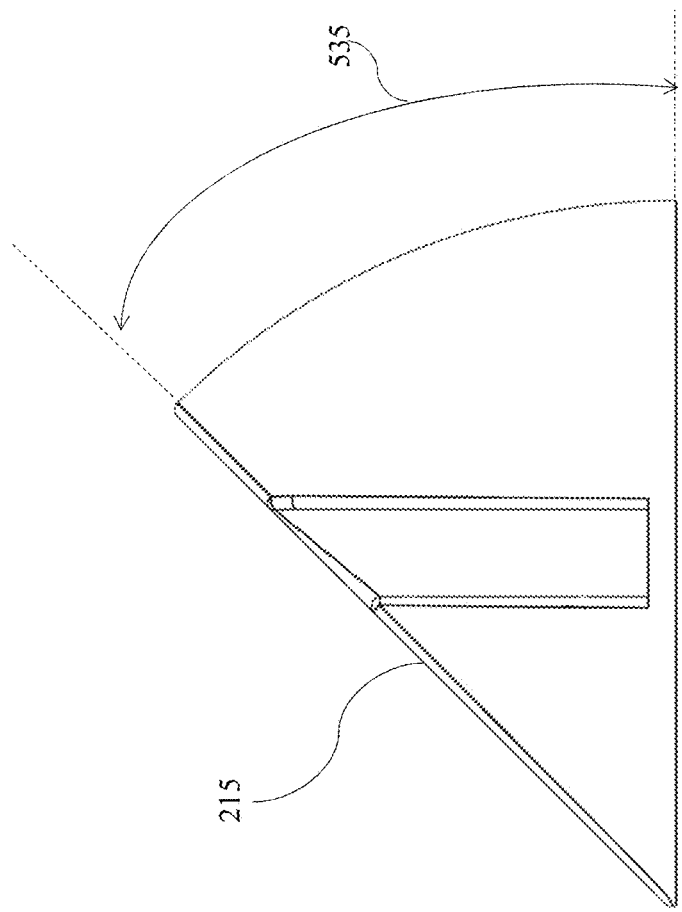
FIG. 8 is a side view of an example angled portion, according to aspects of the present disclosure.

Referring to FIGS. 6-8, the camera 104 may be removably connectable to mount 102, such that mount 102 may secure camera 104 to the first surface 207, according to various aspects of the present disclosure. Housing member 209 of the camera 104 may be secured to the adjusting component 230, wherein adjusting component 230 may be configured to facilitate adjustable rotation of the camera 104 in an amount of 20° about axis 400 (FIGS. 2-3). Adjusting component 230 may further include a base member 234, wherein base member 234 may be configured to be secured to an angled portion 213. In one example, angled portion 213 may be configured to be a wedge shape having an angle 535. The value of the angle 535 may be varied depending on the application and/or the adjustability of the camera 104. In some implementations, the angle 535 may be configured to be approximately 45°. In this case, the combination of angled portion 213 and adjusting component 230 may allow for camera 104 to be adjusted between 0° and 65°. However, in another example, angle 535 may be configured to be less than 45°. The value of angle 535 and thus the general shape of angled portion 213 may be determined by the architecture of the environment in which camera 104 is installed.

Further, angled portion 213 may be positioned relative to an adapter plate 212, a wall switch plate 210, and first surface 107. In one example, adapter plate 212 may secure directly to first surface 107. However, as illustrated in FIG. 5, adapter plate 212 may interoperate with and/or be mounted to wall switch plate 210 such that wall switch plate 210 may secure to first surface 107. In this example, first surface 107 may be comprised of an electrical switch and outlet box as described above with respect to FIG. 2.

Figure 9:
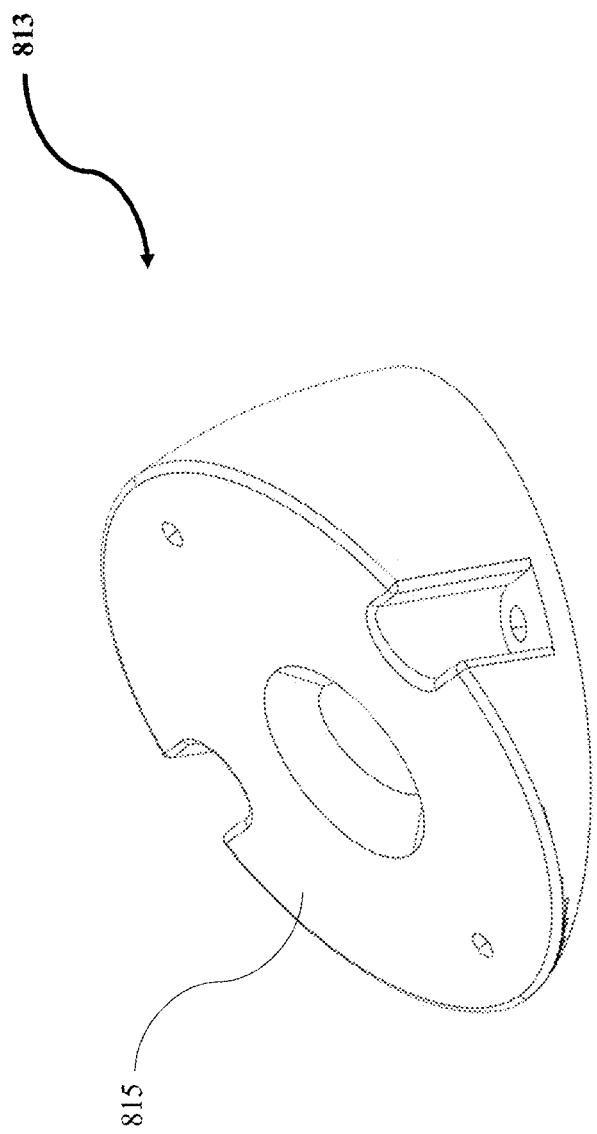
FIG. 9 is a perspective view of an example angled portion, according to aspects of the present disclosure.
Figure 10:
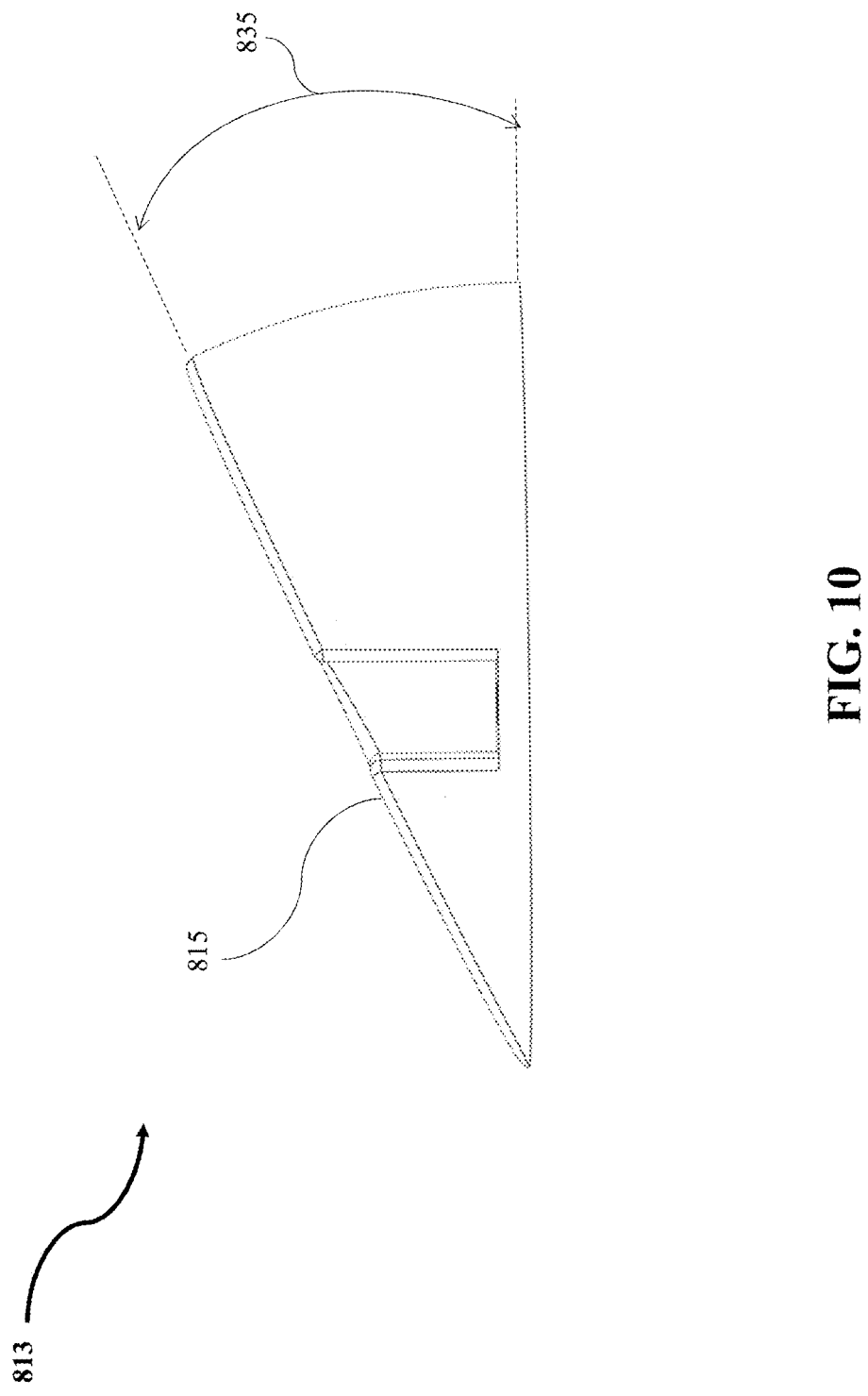
FIG. 10 is a side view of an example angled portion, according to aspects of the present disclosure.
Figure 11:
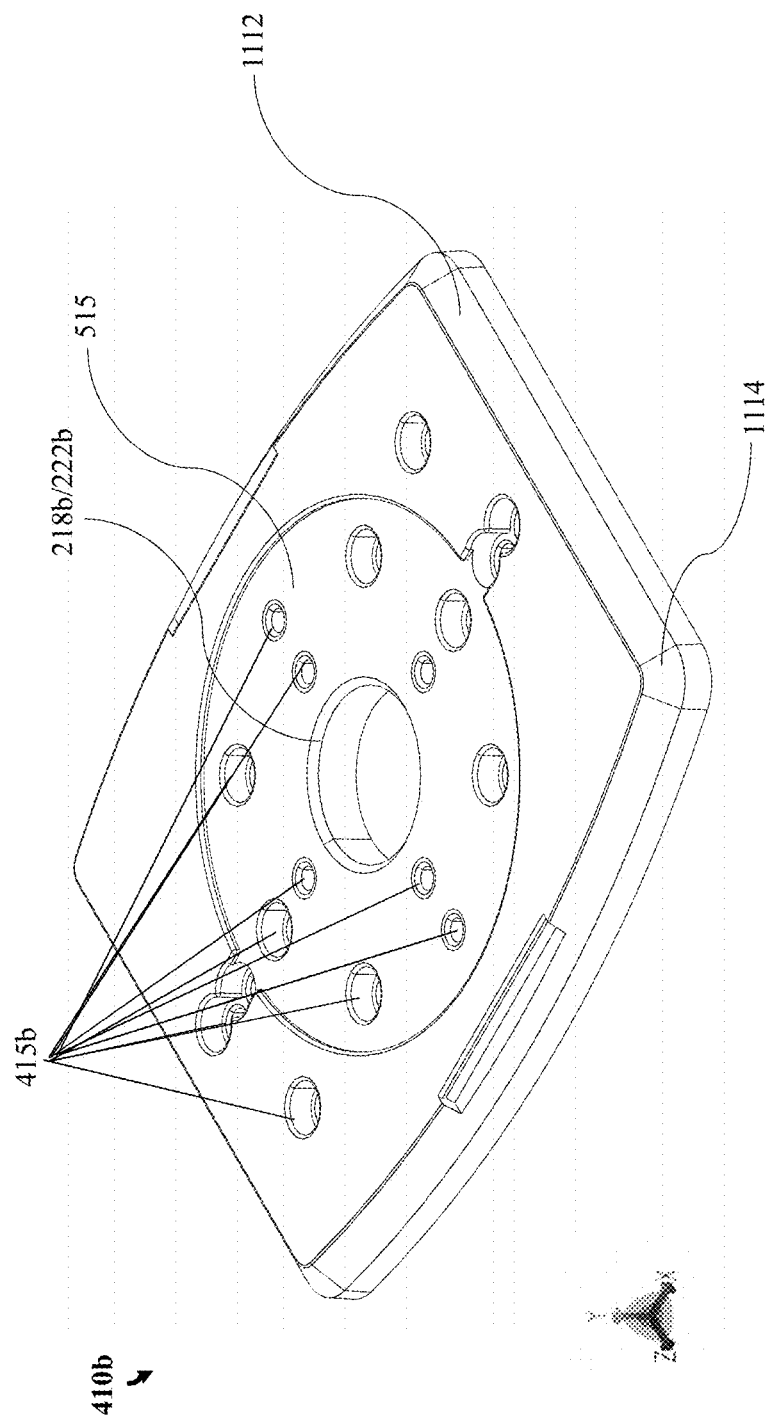
FIG. 11 is a left side perspective view of a combined adapter according to aspects of the present disclosure.
Figure 12A:
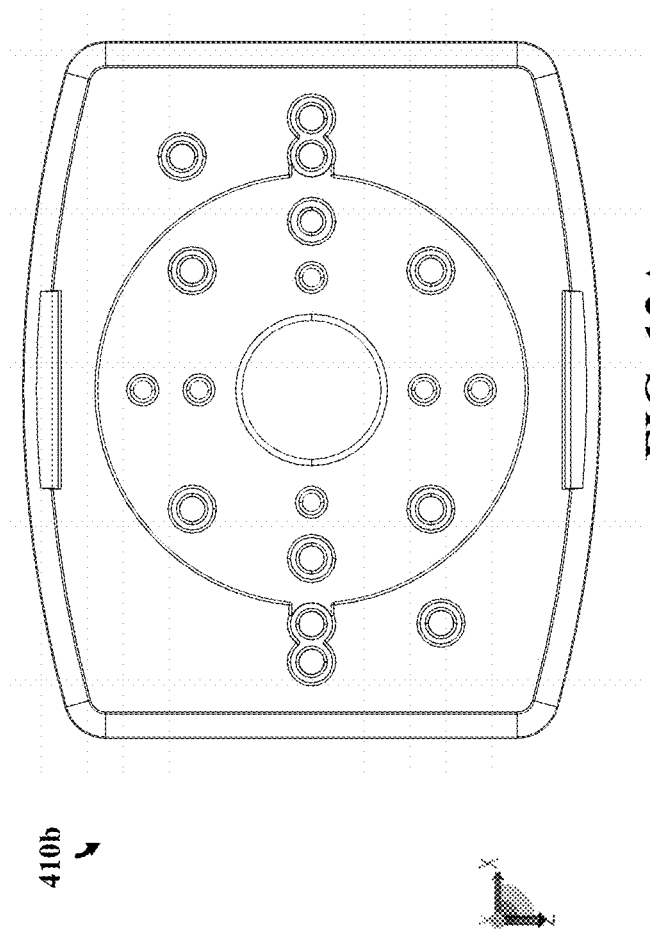
FIGS. 12A and 12B are top and left side views of the combined adapter of FIG. 11 according to aspects of the present disclosure.
Figure 12B:
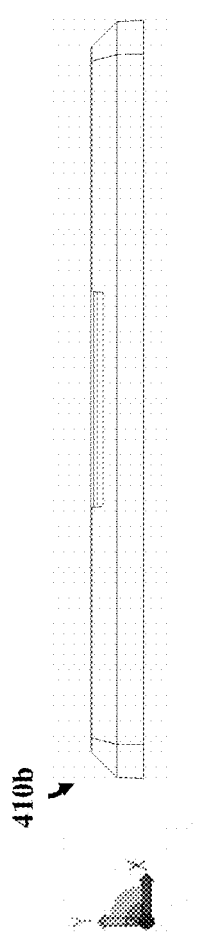

Referring to FIGS. 9 and 10, and in contrast to the approximate 45° angle of angled portion 213 in FIGS. 6-8, an alternative configuration of the camera mount 102 includes angled portion 813 (in place of angled portion 213) forming a wedge shape having an angle 835 less than angle 535. In this example, angle 835 may be configured to be approximately 25°. Consequently, the slope of camera mounting surface 215 relative to a mounting surface (such as mounting surface 107 of FIGS. 2 and 3) of angled portion 213 (see FIGS. 2-3, and 7) may be comparatively steeper than the slope of a camera mounting surface 815 (see FIG. 9). Thus, angled portion 213 and angled portion 813 may be interchangeably installed when assembling the camera mount 102 to allow for a variety of different viewing angles for camera 104. Accordingly, by providing multiple angled portions as described above, e.g., angled portion 213 or angled portion 813, the camera mount 102 may be adaptable for use in a greater variety of locations and/or environments.

FIGS. 11-14B show multiple views of a combined adapter 410b as described above with respect to FIG. 4B. The combined adapter 410b may include any one or combination of the features described in the adapters shown in FIGS. 2-6. The combined adapter 410b may for example include a recessed portion 515 (FIG. 11) that corresponds with either the mounting surface of the angled portion 213 and/or the adjustment bracket 230. The recessed portion 515 may reduce the profile of the assembled mount and/or facilitate with the alignment of the combined adapter with either one of or a combination of the angled portion 213 and/or the adjustment bracket 230 when assembling the bracket. In addition to the recessed portion 515, the combined adapter 410b may include any one or a combination of through holes and/or blind holes 415b. It is noted that not all through holes and/or blind holes are referenced in FIG. 11 to prevent obscuring of the view, however, any one or a combination of the holes shown may be through holes for receiving a fastener therethrough and/or a through hole or blind hole with threads configured to threading engage with a corresponding fastener.

The combined adapter 410b shown in FIGS. 11-14B may also include a rounded or chamfered edge 1112 to improve aesthetics and/or to prevent snagging or potential damage to the combined adapter 410b during use. In addition, the combined adapter 410b may further include rounded edges 1114 to further improve aesthetics and/or prevent snagging or potential damage during use.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A camera mount for mounting a camera, comprising:
   a bracket configured to be mounted to a first surface, wherein the bracket further comprises a first mounting portion configured to be mounted to the first surface and having a first mounting portion surface;
   an angled portion having a mounting interface configured to be connected to the first mounting portion, wherein the angled portion further comprises a camera mounting surface for mounting the camera thereto, wherein the camera mounting surface is angled with respect to the first mounting portion surface;
   wherein the angled portion further comprises a cable routing conduit extending from a first opening at the first mounting portion surface to a second opening at the camera mounting surface for passing a camera cable therethrough; and
   an adjustment bracket configured to be mounted to the camera mounting surface at a first portion and to the camera at a second portion, wherein the adjustment bracket has an adjustment portion for angling the camera with respect to the angled portion.

2. The camera mount of claim 1, wherein the first mounting portion is an adapter plate configured to mount to a wall switch plate, wherein the adapter plate further comprises mounting holes configured to align with a plurality of mounting provisions of the wall switch plate.

3. The camera mount of claim 2, wherein the adapter plate further comprises first mounting provisions configured to align with respective angled portion mounting provisions and receive a threaded fastener.

4. The camera mount of claim 2, wherein the mounting holes comprise a first series of mounting holes configured to align with the plurality of mounting provisions of the wall switch plate and a second series of mounting holes configured to align with mounting provisions of a second type of wall switch plate different from the wall switch plate.

5. The camera mount of claim 2, wherein the adapter plate further comprises a wall plate cable route opening wherein the first opening and the wall plate cable route opening are configured to align and provide a conduit for passing the camera cable therethrough.

6. The camera mount of claim 1, wherein the first mounting portion is a wall plate with mounting holes configured to align with mounting provisions of an electrical switch and outlet box.

7. The camera mount of claim 6, wherein the wall plate further comprises a wall plate cable route opening wherein the first opening and the wall plate cable route opening are configured to align and provide a conduit for passing the camera cable therethrough.

8. The camera mount of claim 1, wherein the adjustment bracket comprises a pivot for adjustment of an angle of the camera with relation to the angled portion.

9. The camera mount of claim 8, wherein the adjustment bracket allows the camera to rotate about 20 degrees with relation to the camera mounting surface.

10. The camera mount of claim 1, wherein the second portion comprises a sliding interface for slideably engaging with the camera.

11. A camera system, comprising:
    a camera;
    a bracket assembly configured to be mounted to a first surface, wherein the bracket assembly further comprises a first mounting portion configured to be mounted to the first surface and having a first mounting portion surface;
    an angled portion having a mounting interface configured to be connected to the first mounting portion, wherein the angled portion further comprises a camera mounting surface for mounting the camera thereto, wherein the camera mounting surface is angled with respect to the first mounting portion surface;
    wherein the angled portion further comprises a cable routing conduit extending from a first opening at the first mounting portion surface to a second opening at the camera mounting surface, wherein the cable routing conduit is configured to have a camera cable passed therethrough; and
    an angular adjustment bracket configured to be mounted to the camera mounting surface at a first portion and to the camera at a second portion, wherein the angular adjustment bracket has an adjustment portion for adjustably angling the second portion with respect to the first portion.

12. The camera system of claim 11, wherein the first mounting portion is an adapter plate having mounting holes configured to align with mounting provisions of a wall switch plate.

13. The camera system of claim 12, wherein the adapter plate further comprises first mounting provisions configured to align with respective angled portion mounting provisions and receive a threaded fastener.

14. The camera system of claim 13, wherein the mounting holes comprise a first series of mounting holes configured to align with the mounting provisions of the wall switch plate and a second series of mounting holes configured to align with mounting provisions of a second type of wall switch plate different from the wall switch plate.

15. The camera system of claim 13, wherein the adapter plate further comprises a wall plate cable route opening wherein the first opening and the wall plate cable route opening are configured to align and provide a conduit for passing the camera cable therethrough.

16. The system of claim 11, wherein the first mounting portion is a wall plate with mounting holes configured to align with mounting provisions of an electrical switch and outlet box.

17. The camera system of claim 16, wherein the wall plate further comprises a wall plate cable route opening wherein the first opening and the wall plate cable route opening are configured to align and provide a conduit for passing the camera cable therethrough.

18. The camera system of claim 17, wherein the angular adjustment bracket comprises a pivot for adjustment of an angle of the first portion with respect to the second portion and the camera with relation to the angled portion.

19. The camera system of claim 18, wherein the angular adjustment bracket allows the camera to rotate about 20 degrees with relation to the camera mounting surface.

20. The camera system of claim 11, wherein the second portion comprises a sliding interface for slideably engaging with the camera.

* * * * *